United States Patent
Kandhasamy Narayanan et al.

(10) Patent No.: US 12,250,131 B2
(45) Date of Patent: Mar. 11, 2025

(54) METHOD AND APPARATUS FOR MANAGING PREDICTION OF NETWORK ANOMALIES

(71) Applicant: Telefonaktiebolaget LM Ericsson (publ), Stockholm (SE)

(72) Inventors: Premnath Kandhasamy Narayanan, Athlone (IE); James O'Meara, Athlone (IE); Paddy Farrell, Athlone (IE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 17/640,960

(22) PCT Filed: Sep. 10, 2020

(86) PCT No.: PCT/EP2020/075395
§ 371 (c)(1),
(2) Date: Mar. 7, 2022

(87) PCT Pub. No.: WO2021/048311
PCT Pub. Date: Mar. 18, 2021

(65) Prior Publication Data
US 2022/0321436 A1    Oct. 6, 2022

Related U.S. Application Data

(60) Provisional application No. 62/898,923, filed on Sep. 11, 2019.

(51) Int. Cl.
*H04L 43/067* (2022.01)
*H04L 41/0631* (2022.01)
(Continued)

(52) U.S. Cl.
CPC .......... *H04L 43/067* (2013.01); *H04L 41/064* (2013.01); *H04L 41/145* (2013.01); *H04L 41/147* (2013.01); *H04L 43/0817* (2013.01)

(58) Field of Classification Search
CPC ... H04L 41/064; H04L 41/145; H04L 41/147; H04L 43/0817
See application file for complete search history.

(56) References Cited

U.S. PATENT DOCUMENTS

2017/0118092 A1* 4/2017 Dixon ..................... H04L 43/04
2019/0362245 A1* 11/2019 Buda ......................... G06N 3/08

FOREIGN PATENT DOCUMENTS

WO    WO-2015055259 A1 *  4/2015   ......... H04L 41/0604

OTHER PUBLICATIONS

International Search Report and Written Opinion dated Nov. 19, 2020 for Application No. PCT/EP2020/075395 filed Sep. 10, 2020, consisting of 10 pages.

(Continued)

*Primary Examiner* — Philip C Lee
(74) *Attorney, Agent, or Firm* — Weisberg I.P. Law, P.A.

(57) ABSTRACT

A method of managing predicting anomalies in operation of a communications network. The method includes receiving network performance data, including network performance data received as time series of values representing monitored characteristics. The method also includes detecting a first anomaly in operation of the communications network and, from historical network performance data, determining if an instance of the first anomaly occurred in the past. If this is a first occurrence of the first anomaly, then based on network performance data received before detecting the first anomaly the method includes building a first model for predicting an instance of the first anomaly and deploying the first model to operate. An apparatus implementing the method is also disclosed.

14 Claims, 9 Drawing Sheets

(51) Int. Cl.
 H04L 41/14    (2022.01)
 H04L 41/147   (2022.01)
 H04L 43/0817  (2022.01)

(56) References Cited

OTHER PUBLICATIONS

Ron Kohavi; "A Study of Cross-Validation and Bootstrap for Accuracy Estimation and Model Selection"; Computer Science Department, Stanford University, 1995, consisting of 7 pages.
"Train your first neural network: basic classification" TensorFlow 2.0 Beta is available; 1.14.0; 2017, consisting of 18-pages.
Ay, Nihat et al. "A Novel Approach to Canonical Divergencies within Information Geometry"; MDPI; Article Entropy, 2015, 17, 8111-8129, consisting of 19 pages.
Introduction to Boosted Trees; XGBoost Tutorials; 2019; xgboost developers, consisting of 7 pages.

* cited by examiner

FIG. 1

Table 1

| Time | Cellular Cell Name | Remote electrical tilt value | Other configuration parameters... | Drop call rate | Physical resource block utilization | Subscriber capacity | other performance counters, KPIs... | Anomaly score |
|---|---|---|---|---|---|---|---|---|
| 12:00 | Service Area Athlone | 10 degrees | | 100 | 93% | 18000 | | 0 |
| 12:00 | Service Area Glasson | 8 degrees | | 12 | 20% | 234 | | 1 |
| 12:00 | Service Area Iona Park | 15 degrees | | 1 | 99% | 32500 | | 0.2 |
| 12:00 | Service Area Moate | 5 degrees | | 300 | 80% | 900 | | 0.03 |
| 12:00 | Service Area Mount Temple | 1 degree | | 54 | 75% | 312 | | 0.5 |
| 12:04 | Service Area Athlone | 10 degrees | | 29 | 23% | 4503 | | 1 |
| 12:04 | Service Area Glasson | 8 degrees | | 7 | 3% | 63.5 | | 1.25 |
| 12:04 | Service Area Iona Park | 15 degrees | | 2.25 | 5% | 8129 | | 0.05 |
| 12:04 | Service Area Moate | 5 degrees | | 78 | 8% | 231 | | 1 |
| 12:04 | Service Area Mount Temple | 1 degree | | 21.5 | 9% | 84 | | 0.12 |
| 12:08 | Service Area Athlone | 10 degrees | | 9.25 | 3% | 1133.75 | | 0.25 |
| 12:08 | Service Area Glasson | 8 degrees | | 10.75 | 10% | 25 | | 0 |
| 12:08 | Service Area Iona Park | 15 degrees | | 2.5625 | 9% | 2041.25 | | 9 |
| 12:08 | Service Area Moate | 5 degrees | | 22.5 | 6% | 67.75 | | 1 |
| 12:08 | Service Area Mount Temple | 1 degree | | 10.375 | 9% | 28 | | 1 |

METHOD AND APPARATUS FOR MANAGING PREDICTION OF NETWORK ANOMALIES

CROSS-REFERENCE TO RELATED APPLICATIONS

This application is a Submission Under 35 U.S.C. § 371 for U.S. National Stage Patent Application of International Application No.: PCT/EP2020/075395, filed Sep. 10, 2020 entitled "METHOD AND APPARATUS FOR MANAGING PREDICTION OF NETWORK ANOMALIES," which claims priority to U.S. Provisional Application No. 62/898,923, filed Sep. 11, 2019, entitled "METHOD AND APPARATUS FOR MANAGING PREDICTION OF NETWORK ANOMALIES," the entireties of both of which are incorporated herein by reference.

TECHNICAL FIELD

The present disclosure relates to network management, in general, and in particular to management of prediction of network anomalies.

BACKGROUND

Incidents in the network are detected and resolved autonomously using well known techniques such as for example anomaly detection, decision trees and matrix factorization. Methods based on anomaly detection may detect anomalies in network performance data by looking at, for example, a volume of network traffic trend over time. Deviation of the monitored volume of network traffic from a level expected in the circumstances (e.g. time of day) may be an anomaly and indicate an incident. Decision trees, on the other hand, derive complex rules from the data (e.g.: why a particular network element is behaving exceptionally good). Matrix factorization conveys the dependency between entities, e.g. incidents and network configuration or Key Performance Indicators (KPIs) and network counters.

While some techniques are capable of detecting anomaly, it remains unknown what domain factors influence it. These techniques are generally based on decision trees and matrix factorization associations.

It is known that network anomalies (anomalies that manifests themselves in network performance data) indicate an existence of a network problem (e.g. network incident). However, detecting anomalies and then network incidents is a reactive rather than a pro-active approach in which resolution and/or recommendation is produced before the problem (incident) occurs. Moreover, domain expert knowledge and insights are limited to known anomalies.

SUMMARY

According to a first aspect of the present invention there is provided a method of managing predicting anomalies in operation of a communications network. The method comprises receiving network performance data, including network performance data received as time series of values representing monitored characteristics. The method also comprises detecting a first anomaly in operation of the communications network and, from historical network performance data, determining if an instance of said first anomaly occurred in the past. If this is a first occurrence of said first anomaly, then based on network performance data received before detecting said first anomaly the method comprises building a first model for predicting an instance of said first anomaly and deploying the first model to operate.

According to a second aspect of the present invention there is provided an apparatus for managing predicting anomalies in operation of a communications network. The apparatus comprises a processing circuitry and a memory. Said memory contains instructions executable by said processing circuitry, whereby said apparatus is operative to receive network performance data, including network performance data received as time series of values representing monitored characteristics and detect a first anomaly in operation of the communications network. Said apparatus is further operative to determine if an instance of said first anomaly occurred in the past based on historical network performance data. If this is a first occurrence of said first anomaly, then based on network performance data received before detecting said first anomaly the apparatus is operative to build a first model for predicting an instance of said first anomaly and deploy the first model to operate.

Further features of the present invention are as claimed in the dependent claims.

BRIEF DESCRIPTION OF THE DRAWINGS

The present invention will be understood and appreciated more fully from the following detailed description taken in conjunction with the drawings in which.

DETAILED DESCRIPTION

Figure 10:
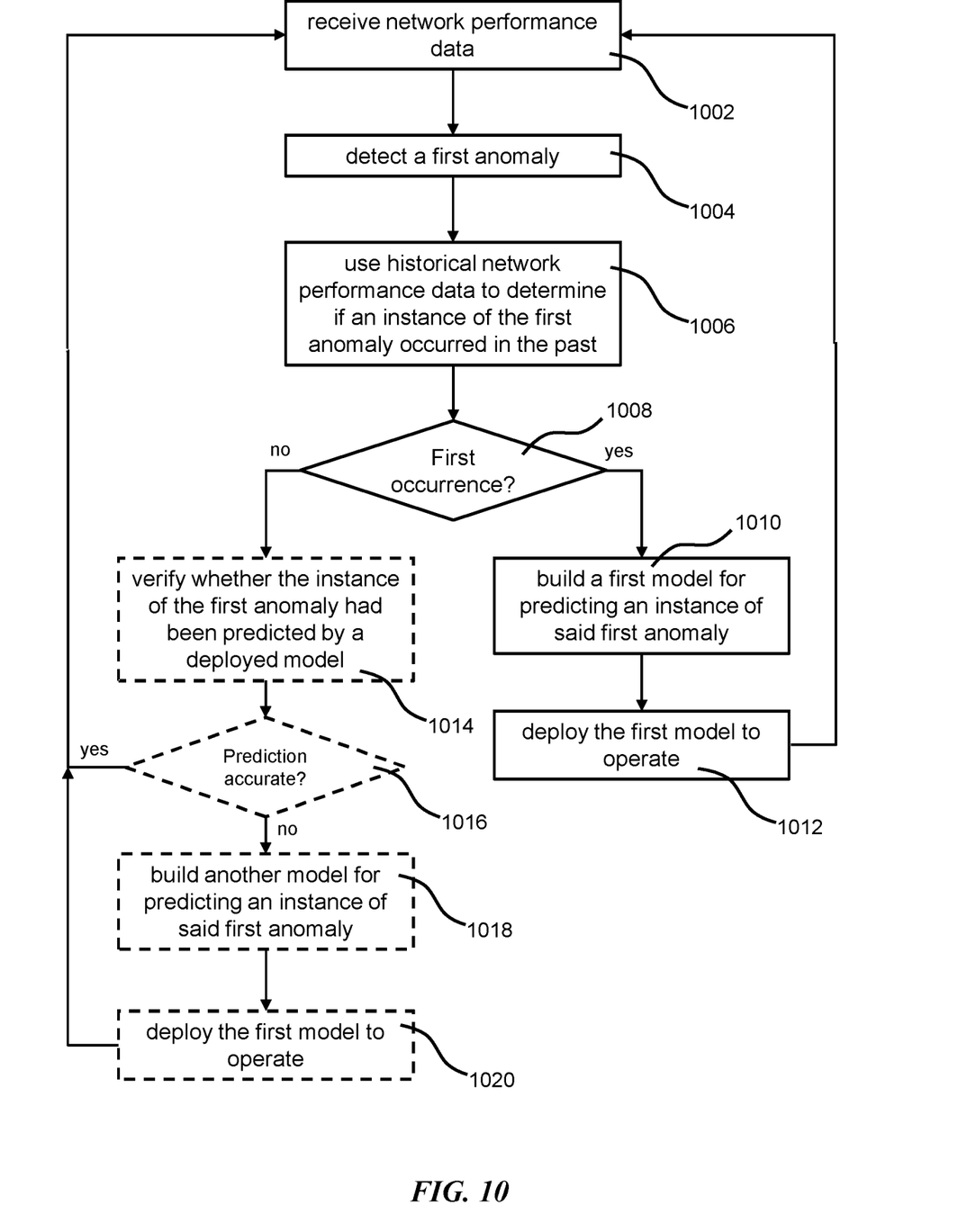
FIG. 10 is a flow chart illustrating an embodiment of the method for managing predicting anomalies in operation of a communications network.

One embodiment of a method of managing predicting anomalies in operation of a communications network is illustrated in FIG. 10. The method preferably comprises receiving, 1002, network performance data. The network performance data may include network performance data received as time series of values representing monitored characteristics as well as individual data. The method further comprises detecting, 1004, a first anomaly in operation of the communications network and then determining, 1006, 1008, from historical network performance data if an instance of said first anomaly already occurred in the past. If this is a first occurrence of said first anomaly, 1008—yes, then based on network performance data received before detecting said first anomaly the method comprises a step of building a first model for predicting an instance of said first anomaly. Once the first model is built, said first model is deployed to operate, 1012.

If this is not a first occurrence of said first anomaly, 1008—no, the method comprises verifying, 1014, whether this instance of the first anomaly had been predicted by a deployed model for predicting an instance of said first anomaly. If said instance of the first anomaly had not been predicted by the deployed model for predicting an instance of said first anomaly, or the prediction was not accurate, step 1016—no, the method comprises developing another model for predicting an instance of said first anomaly and deploying said another model to operate. In a preferred embodiment, the operation of developing another model for predicting an instance of said first anomaly may comprise re-training said first model on a new set of network performance data or updating said first model.

Preferably, the method may further comprise determining if in the received network performance data one or more anomaly coincide with said first anomaly and then use the network performance data indicative of the one or more anomaly coinciding with said first anomaly to build the first model for predicting an instance of said first anomaly. In this way additional influencing factors (apart from the data used to detect the anomaly) are used to develop (build) the prediction model to improve its accuracy of prediction.

In yet another alternative embodiment the method according to embodiment the method comprises clustering at least some of the received time series of the network performance data into at least one cluster and then using the time series of the network performance data from the at least one cluster for building the first model for predicting an instance of said first anomaly. This embodiment further improves accuracy of the prediction model because it exploits relationships between the network performance data that led to detection of the anomaly and other time series of network performance data. The relationships between the time series in a cluster are not only temporal but may also be of a different nature (e.g. based on network topology or physical location, etc.). This allows for detecting trends in at least some of the time series of data that are indeed related with the first anomaly but occur prior to said first anomaly. This, in turn, allows for more accurate prediction of anomalies.

In a further preferred embodiment, the received network performance data comprise network performance data received as individual values and the method comprises converting said individual values to time series of values.

Figure 11:
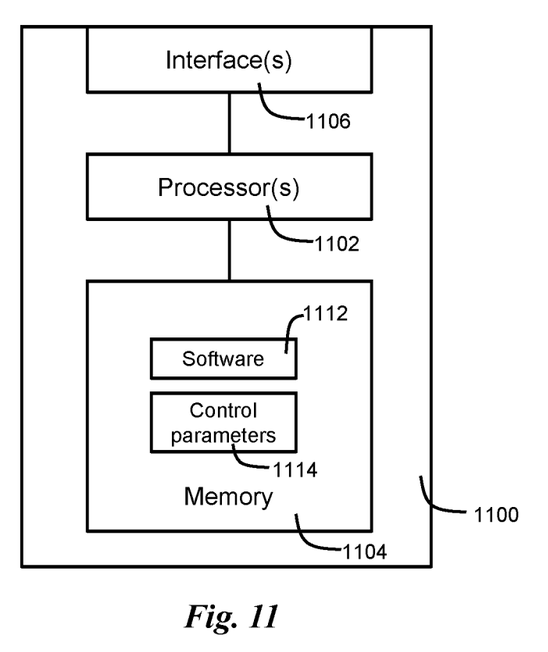
FIG. 11 is a block diagram illustrating an embodiment of an apparatus for managing predicting anomalies in operation of a communications network.

One embodiment of an apparatus, 1100, for managing predicting anomalies in operation of a communications network is illustrated in FIG. 11. The apparatus, 1100, comprises a processing circuitry, 1102, and a memory, 1104. Said memory, 1104, contains instructions, 1112, executable by said processing circuitry, 1102, whereby said apparatus, 1100, is operative to receive network performance data, including network performance data received as time series of values representing monitored characteristics. The apparatus, 1100, is also operative to detect a first anomaly in operation of the communications network and determine if an instance of said first anomaly occurred in the past based on historical network performance data. If this is a first occurrence of said first anomaly, then based on network performance data received before detecting said first anomaly the apparatus, 1100, is operative to build a first model for predicting an instance of said first anomaly and then deploy the first model in the communications network to operate.

In one embodiment, if this is not a first occurrence of said first anomaly the apparatus, 1100, is operative to verify whether this instance of the first anomaly had been predicted by a deployed model for predicting an instance of said first anomaly. If said instance of the first anomaly had not been predicted by the deployed model, or the prediction was not accurate enough (e.g. was too late to initiate remedial action and prevent a failure), the apparatus is operative to develop another model for predicting an instance of said first anomaly and deploying said another model to operate.

In a preferred embodiment to develop said another model for predicting an instance of said first anomaly the apparatus is operative to re-train said first model on a new set of network performance data. In yet another preferred embodiment to develop said another model for predicting an instance of said first anomaly the apparatus is operative to update said first model.

Preferably, the apparatus, 1100, is further operative to determine if in the received network performance data one or more anomaly coincide with said first anomaly and use the network performance data indicative of the one or more anomaly coinciding with said first anomaly for building the first model for predicting an instance of said first anomaly.

Preferably, the apparatus, 1100, is further operative to cluster at least some of the received time series of the network performance data into at least one cluster and use the time series of the network performance data from the at least one cluster for building the first model for predicting an instance of said first anomaly.

In a preferred embodiment the received network performance data comprises network performance data received as individual values and the apparatus, 1100, is operative to convert said individual values to time series of values.

FIG. 11 illustrates one embodiment of the apparatus, 1100, which implements the method of managing predicting anomalies in operation of a communications network described in this document. The apparatus, 1100, may include a processing circuitry (one or more than one processor), 1102, coupled to an interface, 1106, and to the memory 1104. The apparatus, 1100, may comprise more than one interface. For example, one interface may be an Ethernet interface for connecting to other elements of the communications network and another interface may be provided for a network operator to perform management operations on the apparatus 1100. By way of example, the interface 1106, the processor(s) 1502, and the memory 1504 may be connected in series as illustrated in FIG. 11. Alternatively, these components 1102, 1104 and 1106 may be coupled to an internal bus system of the apparatus, 1100. The memory 1104 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory, 1104, may include software, 1112, and/or control parameters, 1114. The memory, 1104, may include suitably configured program code to be executed by the processor(s), 1102, so as to implement the above-described method as explained above.

It is to be understood that the structures as illustrated in FIG. 11 are merely schematic and that the apparatus, 1100, may actually include further components which, for the sake of clarity, have not been illustrated, e.g., further interfaces or processors. Also, it is to be understood that the memory, 1104, may include further program code for implementing other and/or known functionalities.

According to some embodiments, also a computer program may be provided for implementing functionalities of the apparatus, 1100, e.g. in the form of a physical medium storing the program code and/or other data to be stored in the memory 1104, or by making the program code available for download or by streaming.

It is also to be understood that the apparatus, 1100, may be provided as a virtual apparatus. In one embodiment, the apparatus, 1100, may be provided in distributed resources, such as in cloud resources. When provided as virtual apparatus, it will be appreciated that the memory, 1104, processing circuitry, 1102, and physical interface(s), 1106, may be provided as functional elements. The functional elements may be distributed in a logical network and not necessarily be directly physically connected. It is also to be understood that the apparatus, 1100, may be provided as single-node devices, or as a multi-node system.

The advantages of the present solution include (but are not limited to) the following:
- Anomalies are predicted before they occur, and remedial measures are taken to avoid network degradation. This enables a proactive approach of autonomous incident management compared to the current reactive approach.
- Influencing factors are autonomously determined for the incident/anomaly rather than purely relying on historical knowledge base and/or domain expert.
- Autonomous recommendation and incident resolution become feasible due to discovery of determining impacting factors of anomalies. When the impacting factors are known then recommending incident resolutions is feasible and may be derived from the "remedy and configuration catalogues" of those impacting incidents.

In the following description, for purposes of explanation and not limitation, specific details are set forth such as particular architectures, interfaces, techniques, etc. in order to provide a thorough understanding of the solution. However, it will be apparent to those skilled in the art that the solution may be practiced in other embodiments that depart from these specific details. In other instances, detailed descriptions of well-known devices, circuits, and methods are omitted so as not to obscure the description of the solution with unnecessary details.

Reference throughout the specification to "one embodiment" or "an embodiment" means that a particular feature, structure, or characteristic described in connection with an embodiment is included in at least one embodiment of the present solution. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

In the present disclosure the term anomaly (network anomaly) refers to an abnormal behavior of a network component, network function, service or a support component, function or service. The abnormal behavior also includes incidents, like a failure of a component, function or service, however it is not limited in any way to failures. For example, a temperature of a processor raising above a recommended value is an anomaly even if the processor continues to operate. If this is detected and remedial action is taken the temperature may drop to its recommended level. If, in response to the temperature rise the processor performs emergency shutdown procedure then the shutdown is an incident (and also an anomaly). Therefore, in the following description the terms anomaly and incident may be used interchangeably, and the teachings of the various embodiments apply to both terms unless explicitly stated.

The present disclosure provides a solution for managing prediction of network anomalies using a model developed by a machine learning algorithm in which the machine learning algorithm uses historical network performance data for training. Once the model is ready, it is deployed in the network and operates on incoming network performance data. Accuracy of prediction of network anomalies by the model is verified in order to improve the model and achieve higher accuracy of prediction. The amount of historical data increase as the data is collected, so if prediction is not accurate enough (e.g. gets less accurate than in previously) the machine learning algorithm re-trains on new (and in some embodiments bigger set of data) to develop an improved model for anomaly/incident prediction. If a new anomaly/incident is detected (i.e. a new type of anomaly/incident) the machine learning algorithm develops a model in run time for predicting instances of this newly observed anomaly/incident. In a preferred embodiment there are different models deployed for predicting different types of anomalies/incidents (e.g. incidents related to coverage, overheating of a processor, fan failure, etc.).

The solution is based on initial incident or anomaly detection in which an anomaly check is run on received network performance data (key performance indicators (KPIs) counters, alarms, events, CM configurations, etc.) for that resource object or instant. A historical data set is used to build a model for predicting future instances of the same (or similar) incident. Preferably the method also checks if there has been any additional anomaly or trend in a certain time or period on that data set—this is because the incident and operation of the network in the run-up to the incident may result in abnormal behavior of more that one time series of network performance data. Some of the anomalies (or trends) on some of the time series of network performance data may be coincident with the incident, whereas some of the anomalies (or trends) may be present before the incident (e.g. a failure of a hardware or software component).

Using the initial anomaly that led to detection of the incident and any additional anomalies and/or trends a new machine learning prediction model is built at runtime and deployed to predict future occurrence of the initial anomaly (and incident).

Said new machine learning prediction model preferably may also be evaluated before being deployed. The evaluation may be carried out by running the model on test data, which, preferably, is also a set of historical network performance data that exhibits the incident for detection of which the model has been developed, whereas the test data set was not used for development of the prediction model.

Also preferably, further evaluation of the prediction model is carried out in run time—the model predicts an incident (or anomaly) and the prediction is then verified against actual network operation. If the accuracy of the prediction is not as good as expected a new prediction model may be developed.

In addition to correlation of anomalies or trends to build the prediction model a cluster of time series of network performance data may be used as a possible factor for prediction.

It is important to note the distinction between using correlation between anomalies for developing the prediction model and using the cluster of time series of network performance data for developing of said prediction model. These two may be used together or only one of these two approaches may be used in development of the model.

The correlation of anomalies/trends looks at behavior of time series of network performance data that is substantially aligned in time, in other words the anomalies (trends) coincide.

Clustering, on the other hand, considers not only temporal relationships among the time series of network performance data, but also other types of relationships, e.g. network topology, hardware or software dependency, etc. For example, two network elements, not related in network topology, may be in the same physical location, cooled by the same air-condition equipment. Time series of network performance data from these different types of equipment may demonstrate different temporal behavior and will not be considered in the embodiment based only on correlation of anomalies/trends in the time series. The cluster, on the other hand, may include KPIs/counters (and other time series of network performance data) which demonstrate behaviour temporarily coincident with the incident as well as time series of network performance data related based on other factors. Some of them may, however, show anomaly or distinctive trend earlier, before the incident. Techniques for verifying similarity may then help identify these KPIs/counters that are abnormal before the incident occur and related with the incident. Then, this can be used to enhance the prediction model.

There are several known clustering techniques that could be used for clustering time series of network performance data and these will be identified and briefly discussed later.

This approach performs clustering of time series of network performance data where each KPI/counter is compared against all other counters to find relationships, i.e. what counters influence each other both from a positive and negative point of view. Counters that show this relationship may be included in the prediction model for evaluation and may improve accuracy of the prediction model. The accuracy of prediction of the prediction model is evaluated and if not accurate enough (required accuracy may be implementation specific) then will not be considered a good prediction model. As this is a dynamic system the prediction model is under constant review and may be updated when the data changes or the model drifts in accuracy.

In the proposed solution on-demand machine learning models are created based on network data such as events, counters, configurations and KPIs (but not limited to).

The model is created based on key influencing factors, for example: user plane data throughput is impacted due to sudden interference in the network that lead to repeated re-transmissions and increase in control plane data such as periodic user equipment measurements for a self-healing autonomous function; CPU load in a virtual function is caused by increase in subscribers, availability/allocation of compute, storage and networking allocation of the virtual function.

The on-demand created model can predict future network anomalies before they occur based on historical data of influencing factors that can potentially help in mitigating the network behavior before the problem occurring again, rather than reacting to recommender systems based on anomaly and knowledge base. The term "influencing factors" refers here to time series of network performance data that are in some relationship with the network performance data that indicates the incident (or anomaly). As discussed earlier, these "influencing factors" may be time series of network performance data correlated with the incident (temporal relationship only) or time series of network performance data clustered based on any type of relationship (including temporal). These "influencing factors" may also influence development of the incident, although not always the root cause of the incident. For example, if the incident is an emergency shutdown of a module the influencing factor may be increased temperature of the processor caused by increased temperature of the air in the cabinet or room, which in turn may be caused by air condition failure or the door to the cabinet/room being left open. The "influencing factor" considered by the prediction model in this case may be the room temperature and not air-condition status or door sensor reading.

Figure 1:
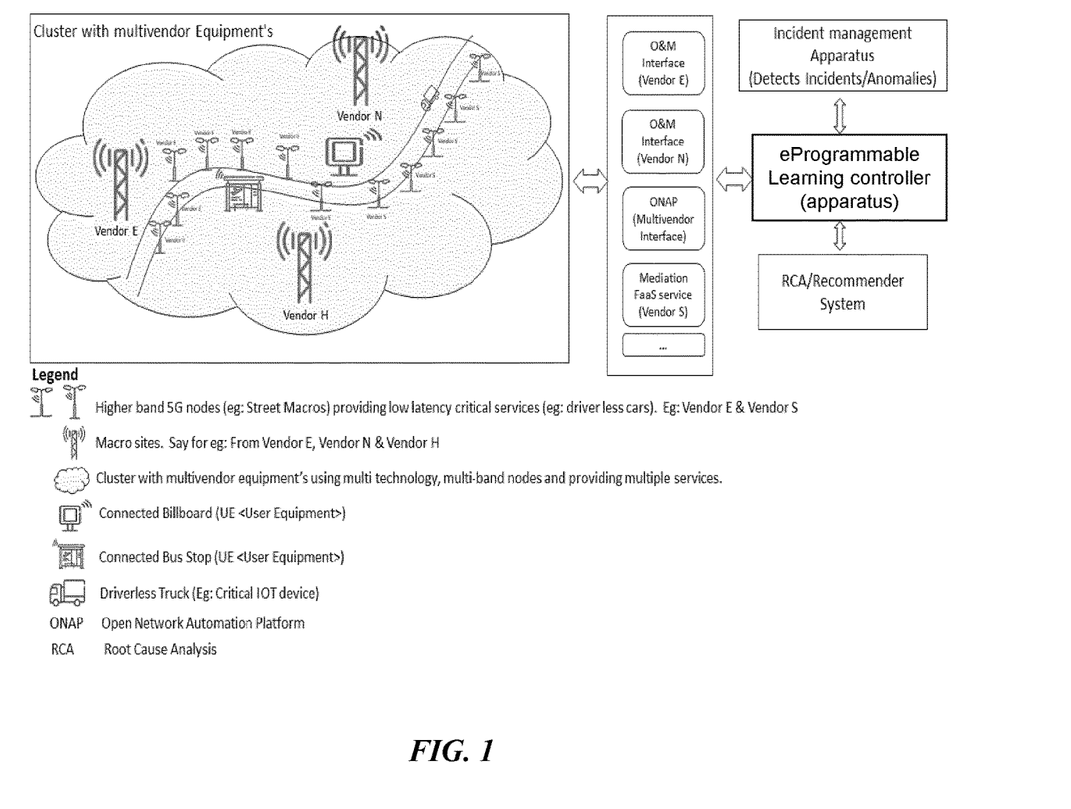
FIG. 1 is a diagram illustrating an architecture of a network in which an apparatus in one embodiment disclosed in this document operates.

In one embodiment an apparatus (referred to as eProgrammable learning controller, ePLC and shown in FIG. 1) is configured to dynamically create incident prediction models based on anomalies detected in the network:

An anomaly check is run on received network performance data (key performance indicators (KPIs) counters, alarms, events, CM configurations, etc.) for that resource object or instant. A historical data set is used to build a model for predicting future instances of the same (or similar) incident.

The apparatus checks if there has been any anomaly or trend in a certain time period on that data set (correlation of anomalies and trends with the incident).

The apparatus, using the initial anomaly (incident) and influencing factors, i.e. the correlated additional anomalies and/or clusters of time series of network performance data a new machine learning prediction model is built at runtime and then preferably evaluated and deployed to predict future occurrences of the initial anomaly (incident).

Preferably, in operation, the apparatus operating the prediction model may propose recommendations.

The following steps may be carried out in one embodiment by the ePLC apparatus:

Step 1: Identifying the influencing factors for the detected anomaly.

Step 2: Predicting the future anomalies based on historical network data.

Step 3: Proposing remedies for recommendation system.

Further details of these steps are described below.

Figure 2:
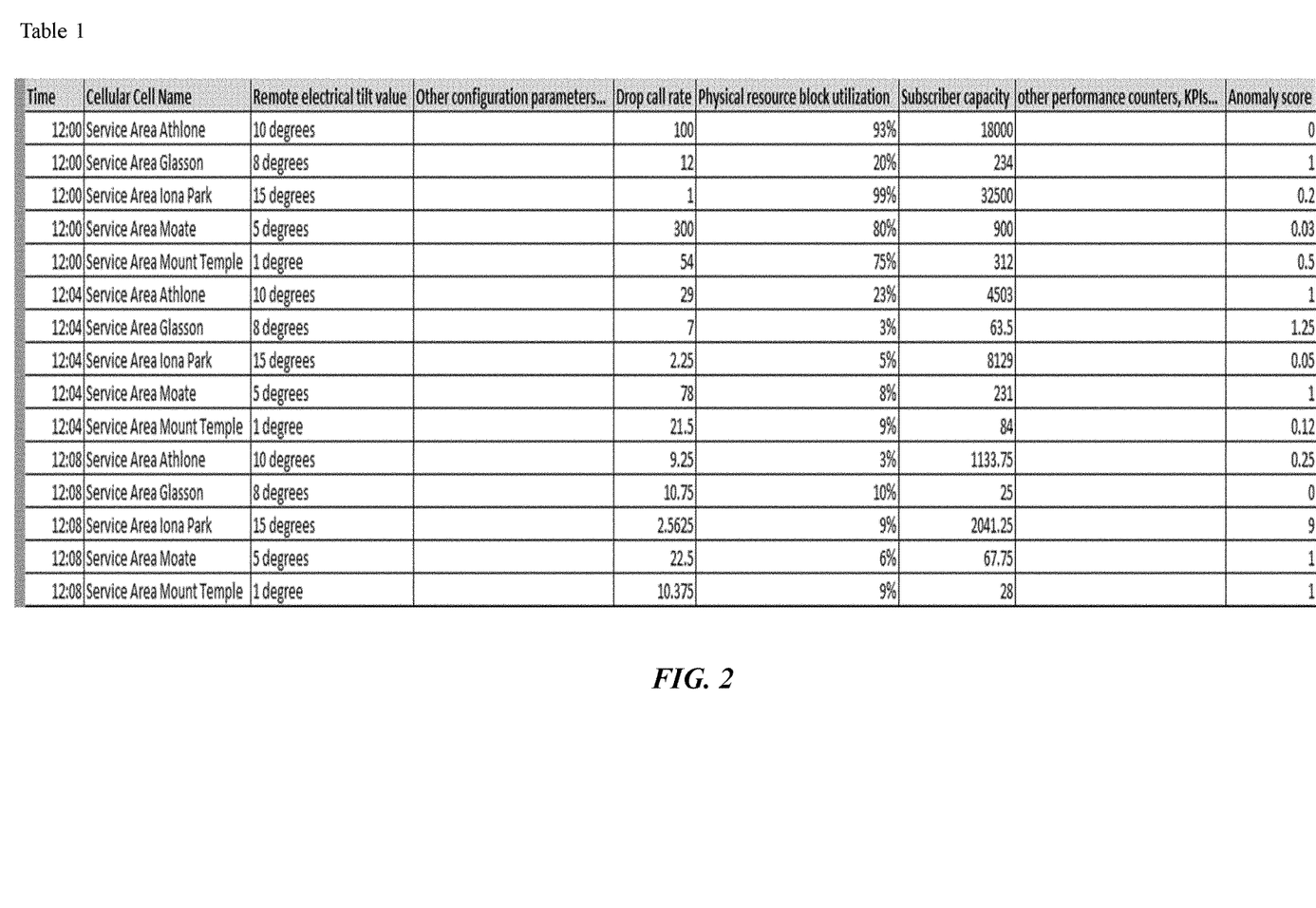
FIG. 2 is a table containing an example of information of anomaly score for service areas prepared by the apparatus operating in one embodiment of a method disclosed in this document.

Identifying the Influencing Factors for the Detected Anomaly by Incident Management Apparatus 1) The ePLC apparatus prepares the data as in table 1 shown in FIG. 2. The table contains information of anomaly score for service areas (eg: cell of a wireless communications network), all its configuration parameters, events (eg: handover success event) and performance measurement counters (eg: drop call rate, downlink physical resource block utilization).

2) The ePLC apparatus feeds in the data into a model builder sub-system (within the eProgrammable learning controller—ePLC) for run-time model generation.

Figure 3:
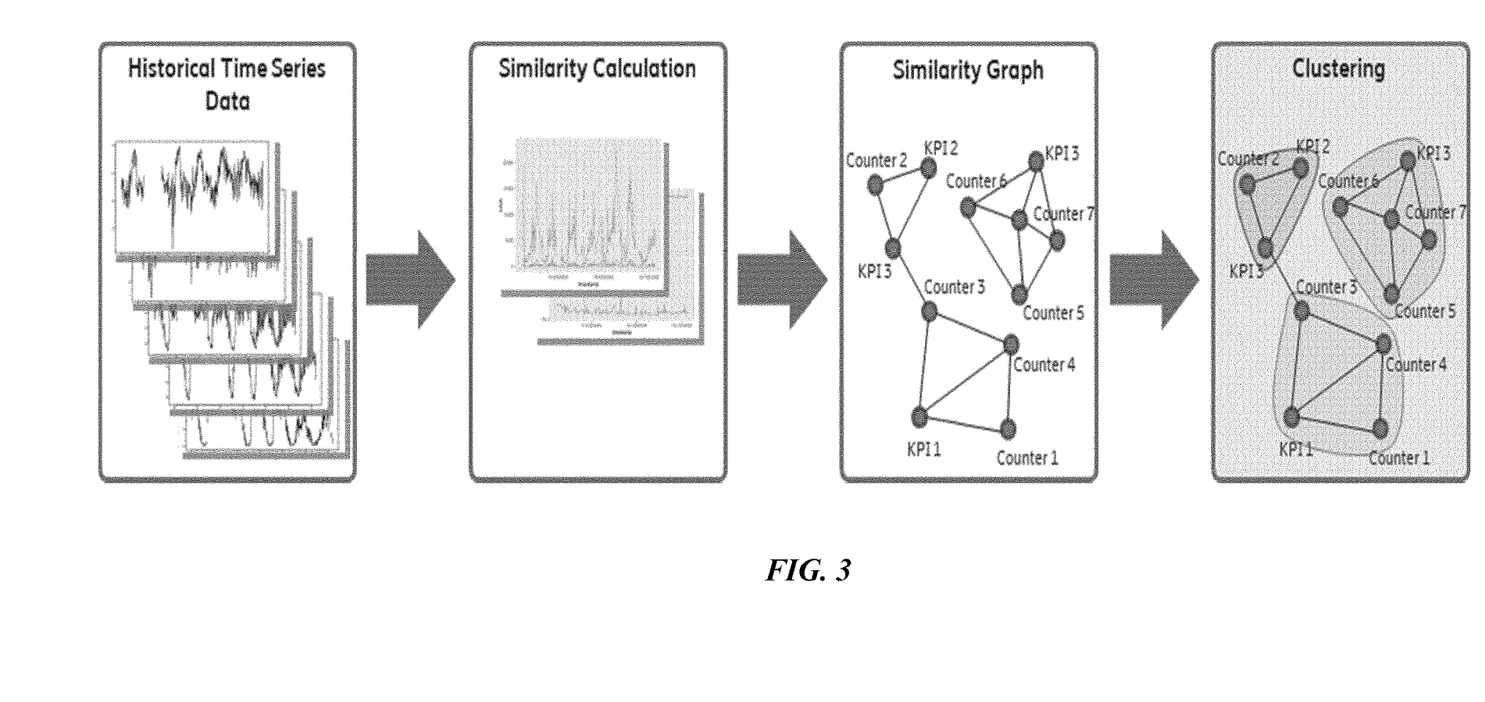
FIG. 3 is a chart illustrating a workflow of a clustering algorithm employed for detection of influencing factors in one embodiment of the method disclosed in this document.
Figure 4:
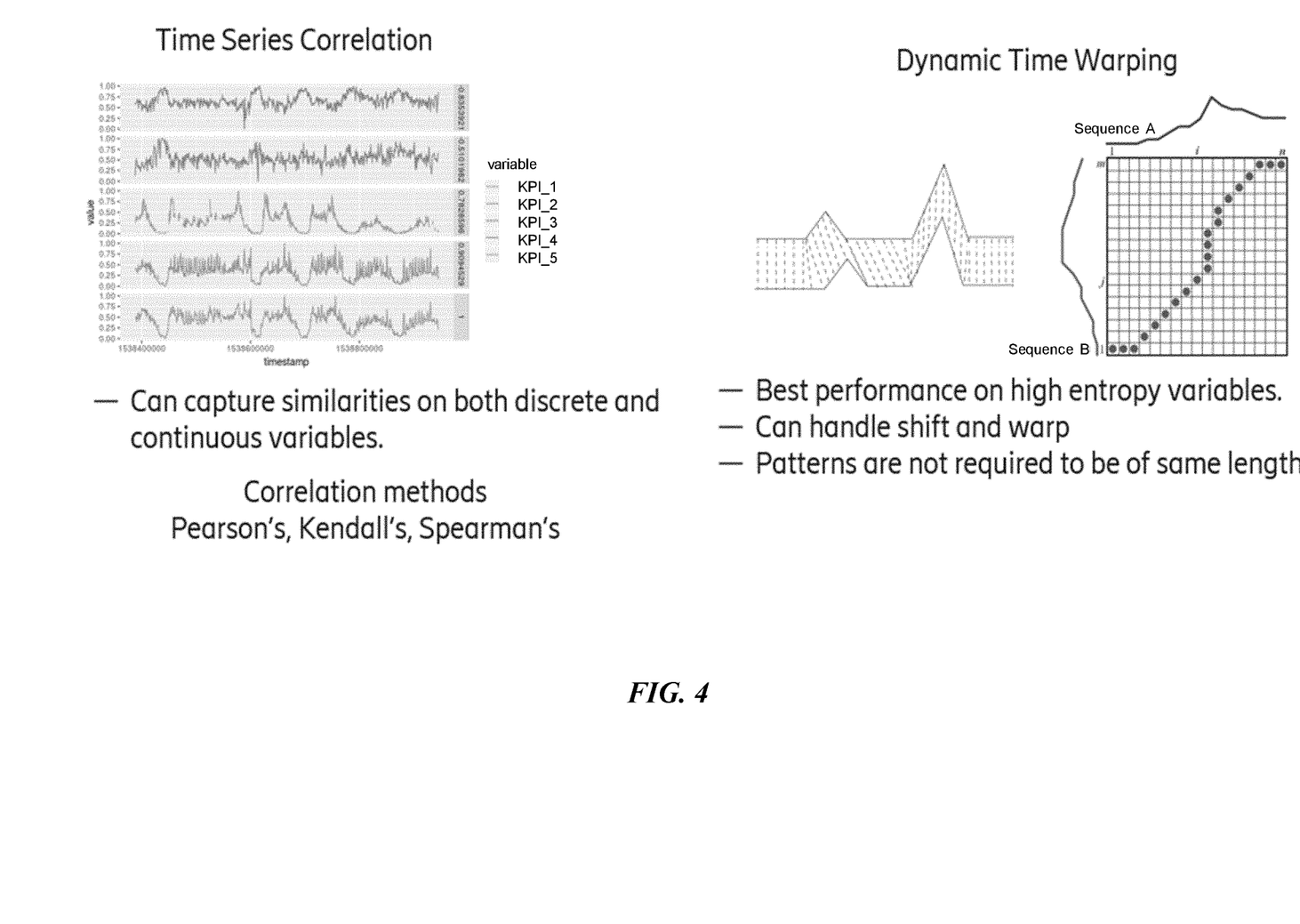
FIG. 4 illustrates examples of time series data and possible application of dynamic time warping for correlation of the time series data for model creation in one embodiment of the method disclosed in this document.
Figure 5:
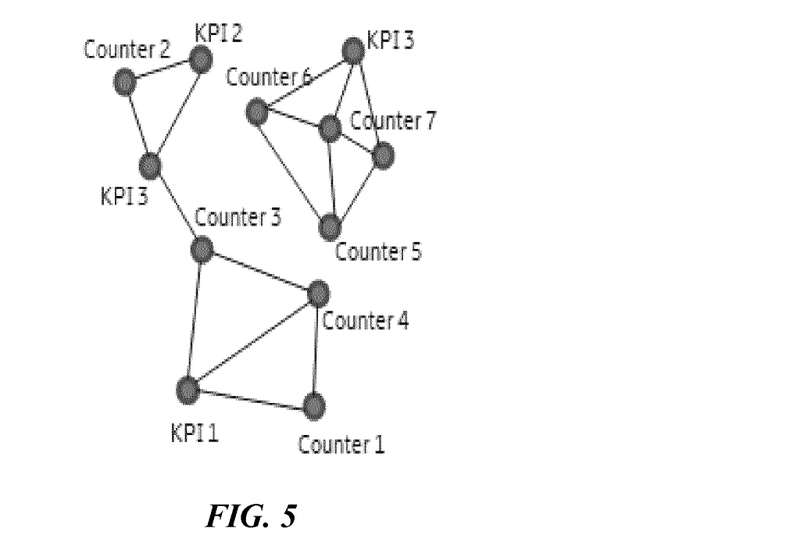
FIG. 5 illustrates an example of similarity graph that may be generated for model creation in one embodiment of the method disclosed in this document.
Figure 6:
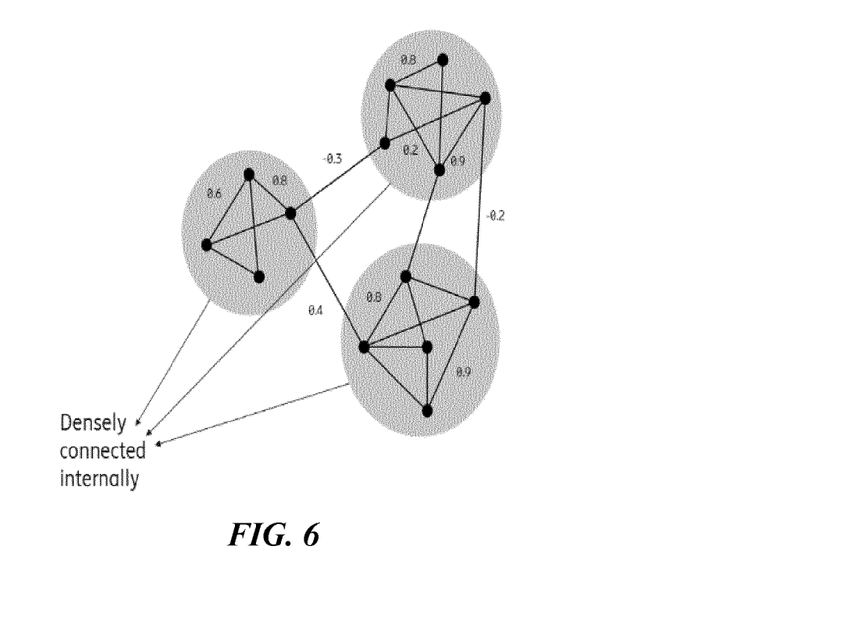
FIG. 6 illustrates an example of clustering technique that may be used for model creation in one embodiment of the method disclosed in this document.

3) The model builder sub-system builds the model that can predict the anomalies based on inference data and makes it available for ePLC predictor sub-system for operation. The following are detailed operations performed in one embodiment by the model builder apparatus:
a. The data prepared (as in table 1) in a columnar format (all features as columns, along with the target that needs to be predicted, eg: Anomaly score) is considered by model builder sub-system.
b. Data Preparation: on the columnar data:
   i. The model builder inputs the missing values and handles duplicates.
   ii. The model builder identifies additional features using correlation and clustering techniques. The model builder finds close correlation (both positive and negative) between features (columns). Then a clustering algorithm is employed for detection of other influencing factors as illustrated in the embodiment shown in FIG. 3 and described below.
      Similarity Calculation: In one embodiment similarities between time series data may be found using a combination of Pearson's, Kendal's and Spearman's well knows correlation methods and shift, wrap is handled using Dynamic Time warping methods, FIG. 4.
      Similarity Graph (see FIG. 5): Similarity graph may be generated using relation scores:
      Each node represents a counter.
      Similarities between counters represent edges in the graph.
      Clustering (see FIG. 6): Techniques like community clustering (and others too) may be used to cluster graphs.
      Influencing counters/KPIs are part of the communities. All other counters/KPIs as part of the key influencing counters/KPIs are considered additionally as influencing factors for model creation.
   iii. The model builder builds a set of data that the pre-defined set of Machine Learning (ML) model expects. Eg: string to numeric conversion.
      Below are listed examples of pre-defined ML models that may be used in embodiments of this solution. It is noted, however, that alternative ML models may be used as well.
      XG Boost [1]: Gradient Boosted Trees Classifier
      Random forest classifier (Gini/Entropy) [4]
      Vowpal wabbit classifier [2]
      TensorFlow Neural Network classifier [3]
   Note: Model builder builds different data sets in parallel according to the requirement of the ML models.
c. Training and test set: the model builder prepares training and test data. For example, divides 80% of the data as training set and remaining 20% as test set.
d. Model training: The model may be trained with the training data and evaluated using one of the known techniques, such as: Receiver operating characteristic (ROC) curve, Area Under curve (AUC), Precision/Recall/F1 score. Also, there may be some different measures taken to evaluate the model according to the model's literature. During this phase the features in the model are well categorized for example as "highly influential", "full set", etc.
e. Cross validation [5] and hyperparameter tuning: In this step cross validation may be performed and hyperparameters may be continuously tuned and iteratively executed. Once a balance is reached between bias and variance the model is marked as trained. Trained models are ranked based on the evaluation score and the highest scoring model is marked as "highly ranked inference model".

Predicting Future Anomalies Based on Historical Network Data
1) The ePLC apparatus prepares network performance data for prediction. The network performance data may include events, network configuration, KPIs and performance counters based on the needs of predictor subsystem. Note: This data is preferably a time series data, but when CM attributes, alarms and events are available, they normally are recorded as individual data. In this situation such individual data may be converted into time series data. After conversion the value will be same in a time series data until a new value is received.
2) The predictor sub-system predicts anomalies for the given events, network configuration and performance counters.
3) The ePLC apparatus collects feedback about effectiveness (accuracy) of predictions and in some embodiments may periodically request the model builder sub-system to build a new version of the model based on latest data. The feedback may indicate a data drift resulting in false positive and false negative predications, which are captured either as user feedback or autonomously based on recommender sub-system success ratio. On detection of data drift, high number of false positives, false negatives requests the model builder sub-system may build a new model based on drifted data.

Figure 7:
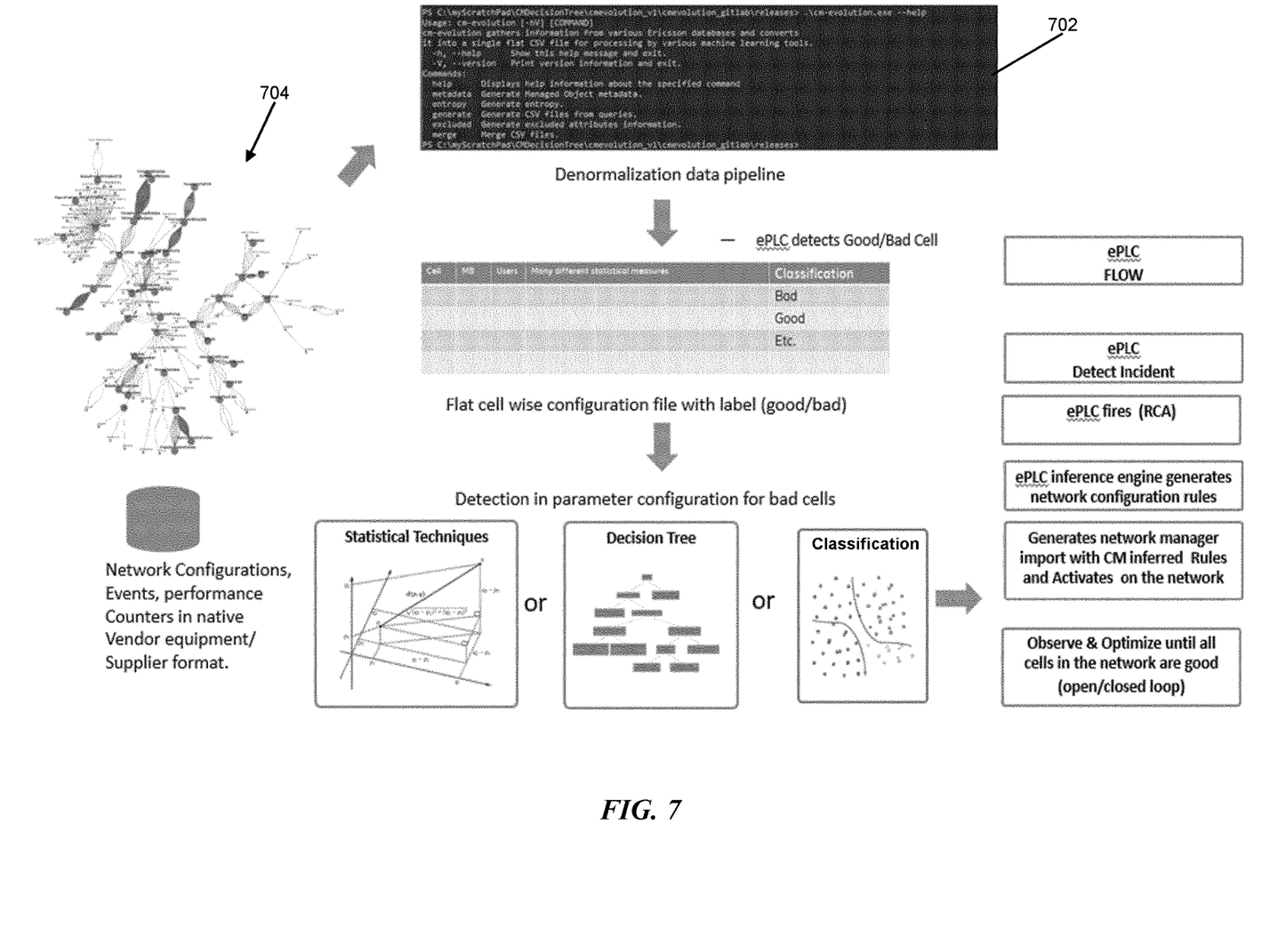
FIG. 7 illustrates an example workflow of a recommender system implementing an embodiment of the method disclosed in this document.

Proposing Remedies by a Recommender System (See FIG. 7)
1) In one embodiment the ePLC apparatus may detect a good/bad cell based on anomaly score. For example: when the anomaly score is less than 0.5, then the cell is marked as "good" else marked as "bad". The anomaly score is determined based on data from a network graph, 704, which is a representation of data including network configuration, events, performance counters in native equipment format, or formats if the equipment in the network s from different suppliers. The data from the network graph, 704, goes via a Data Pipeline Subsystem 702, which is a set of "data wrangling" and "data transformation" programs that convert the vendor suppliers' data format to format that is needed by AI/ML algorithms.
2) In one embodiment the ePLC apparatus may use statistical techniques (eg: Euclidean distance [5]) or Decision tree machine learning algorithm (eg: CART, J4.5) or classification algorithms (eg: [1]-[3])) to determine why the given cell is bad, what are those network configurations that need attention.
3) Based on the calculations the ePLC apparatus may provide configurations that needs attention to RCA/recommender system for further analysis. The RCA/Recommender system, in turn, makes changes to network based on remedy actions as specified in network configuration catalogue.

Figure 8:
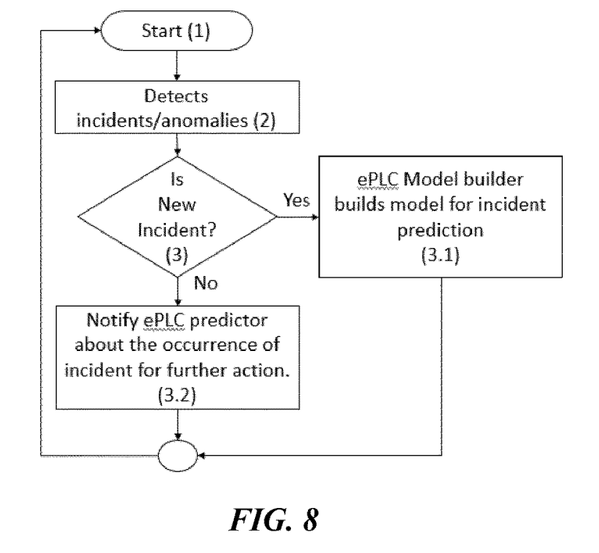
FIG. 8 and FIG. 9 illustrate operation of one embodiment of the method for managing predicting anomalies in operation of a communications network.

FIG. 8 illustrates one embodiment of the method of managing predicting anomalies in operation of a communications network.
1) Autonomous process is started and runs in the background.
2) Incident management function detects a new anomaly.

3) Based on historical network performance data the method checks whether the anomaly is a new type of anomaly or one detected (known) before.
3.1) If the anomaly is of a new type of anomaly then a prediction model is built and then deployed to operate.
3.2) If the anomaly is of a known type then it is checked the anomaly was expected from any of the existing models (i.e. whether the anomaly was predicted by any of the existing models) and appropriate action is taken. The action may include notifying recommender system for remedial action since the expected anomaly (incident) has occurred. Another action may include re-training the model when additional influencing factors are detected.

In this way the prediction model is under constant review and updated when the data changes (e.g.: has additional features and more data series of network performance data is available) or the model drifts in accuracy.

Figure 9:
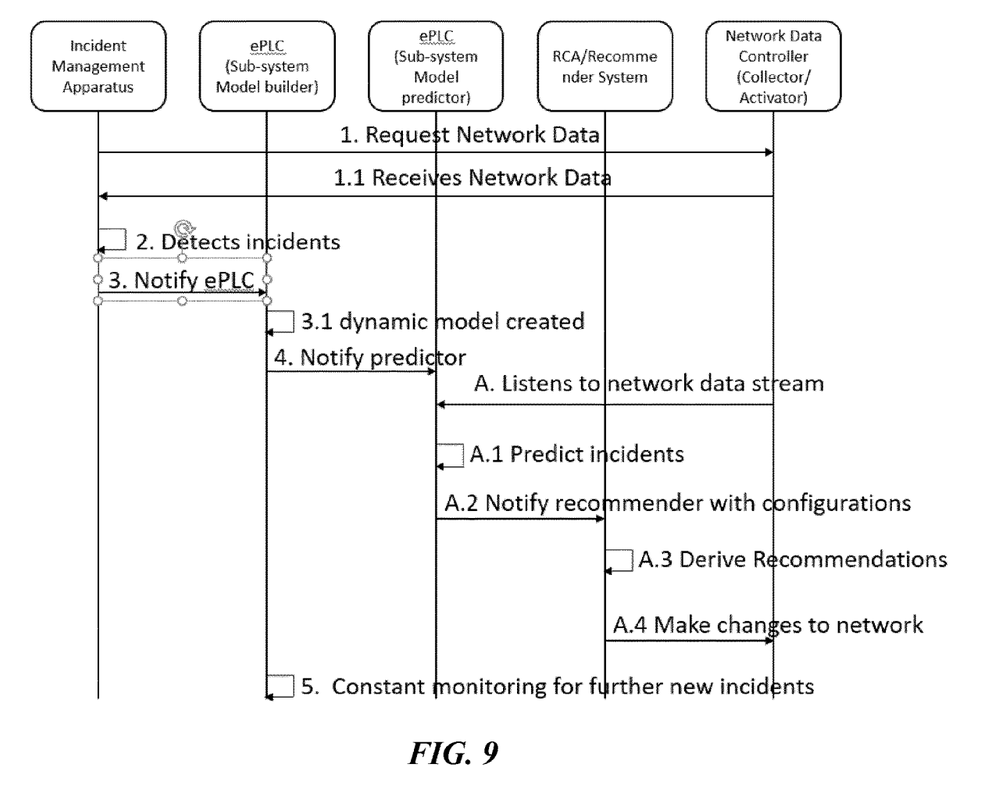

FIG. 9 illustrates further details of operation of one embodiment of the method of managing predicting anomalies in operation of a communications network.
1. An Incident Management apparatus requests network performance data.
1.1 The IM apparatus receives network data (e.g.: Alarms, counters, events, configurations, KPI values, etc.)
2. The IM apparatus detects anomalies.
3. The IM apparatus notifies the ePLC Model builder and requests building an incident/anomaly detection model. Additionally, the IM apparatus prepares and provides historical network performance data to the ePLC Model builder.
3.1 The ePLC Model builder creates dynamic model based on the historical network performance data received from IM apparatus.
4. The ePLC Model builder notifies an ePLC Predictor with the new model.
A. The ePLC Predictor listens to network performance data.
A.1 The ePLC Predictor predicts future anomalies/incidents for the model.
A.2 The ePLC Predictor notifies a RCA/Recommender with possible network configurations to look.
A.3 The RCA/Recommender derives recommendation from a network configuration catalogue.
A.4 The RCA/Recommender makes changes to the network for incident resolution or provides manual resolution steps for the cases where network resolution should be done manually (e.g.: fixing circuits, fans, fuse, etc.).
5. The model is under constant re-train mode. As the data change the re-training will catch new dependencies, remove old ones and validates to maintain the accuracy of the new model.

The methods of the present disclosure may be deployed on any bare metal or private cloud or public cloud as a software component. It can run inside a container (e.g.: Docker) and can be deployed on a cloud native, orchestrated environment (e.g.: kubernetes). The solution may ca be deployed as a VNF alongside the existing physical and/or virtual node.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended embodiments. The word "comprising" does not exclude the presence of elements or steps other than those listed in an embodiment, "a" or "an" does not exclude a plurality, and a single processor or other unit may fulfil the functions of several units recited in the embodiments. Any reference signs in the embodiments shall not be construed so as to limit their scope.

REFERENCES

[1] XG Boost gradient classifier: https://xgboost.readthedocs.io/en/latest/tutorials/model.html?highlight=classifier
[2] Vowpall wabbit classifier: https://github.com/Vowpal-Wabbit/vowpal wabbit/wiki
[3] Tensorflow Neural Network classifier: https://www.tensorflow.org/tutorials/keras/basic classification
[4] How The Random Forest Algorithm Works In Machine Learning: https://dataaspirant.com/2017/05/22/random-forest-algorithm-machine-learing/
[5] Cross Validation: Kohavi, Ron (1995). "A study of cross-validation and bootstrap for accuracy estimation and model selection". Proceedings of the Fourteenth International Joint Conference on Artificial Intelligence. San Mateo, CA: Morgan Kaufmann. 2 (12): 1137-1143. CiteSeerX 10.1.1.48.529
[6] Ay, Nihat; Amari, Shun-ichi (2015). "A Novel Approach to Canonical Divergences within Information Geometry". Entropy. 17 (12). pp. 8111-8129. doi:10.3390/e17127866

The invention claimed is:
1. A method of managing predicting anomalies in operation of a communications network comprising:
receiving network performance data before detecting a first anomaly, at least a portion thereof being received as time series of values representing monitored characteristics;
clustering the time series of values into at least one cluster by:
comparing each of a plurality of counters against each other counter of the plurality of counters; and
identifying, based on the comparing, at least one subset of the plurality of counters for which at least one relationship exists, such that each counter in the at least one subset of the plurality of counters influencing or being influenced by at least one other counter in the at least one subset of the plurality of counters, the at least one relationship including a non-temporal relationship;
detecting the first anomaly in operation of the communications network;
from historical network performance data, determining if an instance of the first anomaly occurred in the past;
when the instance of the first anomaly has not occurred in the past, then based on the network performance data received before detecting the first anomaly:
building a first model for predicting the instance of the first anomaly, the first model including the at least one subset of the plurality of counters;

determining, based on the network performance data received before detecting the first anomaly, that at least one additional anomaly coincides in time with the first anomaly;

updating, using the network performance data received before detecting the first anomaly indicative of the at least one additional anomaly, the first model for predicting the instance of the first anomaly; and deploying the first model to operate; and when the instance of the first anomaly has occurred in the past, verifying whether the instance of the first anomaly had been predicted by a deployed model for predicting the instance of the first anomaly.

2. The method according to claim 1, wherein if the instance of the first anomaly had not been predicted by the deployed model for predicting the instance of the first anomaly, the method comprises developing another model for predicting the instance of the first anomaly and deploying the another model to operate.

3. The method according to claim 1, further comprising:
using the time series of the network performance data received before detecting the first anomaly from the at least one cluster for building the first model for predicting the instance of the first anomaly.

4. The method according to claim 1, wherein the received network performance data received before detecting the first anomaly comprises network performance data received as individual values and the method comprises converting the individual values to the time series of values.

5. The method according to claim 2, wherein the operation of developing the another model for predicting the instance of the first anomaly comprises re-training the first model on a new set of network performance data.

6. The method according to claim 2, wherein the operation of developing the another model for predicting the instance of the first anomaly comprises updating the first model.

7. An apparatus for managing predicting anomalies in operation of a communications network, the apparatus comprising a processing circuitry and a memory, the memory containing instructions executable by the processing circuitry whereby the apparatus is configured to:

receive network performance data before detecting a first anomaly, at least a portion thereof being received as time series of values representing monitored characteristics;

cluster the time series of values into at least one cluster by:
comparing each of a plurality of counters against each other counter of the plurality of counters; and
identifying, based on the comparing, at least one subset of the plurality of counters for which at least one relationship exists, such that each counter in the at least one subset of the plurality of counters influencing or being influenced by at least one other counter in the at least one subset of the plurality of counters, the at least one relationship including a non-temporal relationship;

detect the first anomaly in operation of the communications network;

determine if an instance of the first anomaly occurred in the past based on historical network performance data;

when the instance of the first anomaly has not occurred in the past, then based on the network performance data received before detecting the first anomaly:
build a first model for predicting the instance of the first anomaly, the first model including the at least one subset of the plurality of counters;
determine, based on the network performance data received before detecting the first anomaly, that at least one additional anomaly coincides in time with the first anomaly;
update, using the network performance data received before detecting the first anomaly indicative of the at least one additional anomaly, the first model for predicting the instance of the first anomaly; and
deploy the first model to operate; and when the instance of the first anomaly has occurred in the past, verifying whether the instance of the first anomaly had been predicted by a deployed model for predicting the instance of the first anomaly.

8. The apparatus according to claim 7, wherein if the instance of the first anomaly had not been predicted by the deployed model for predicting the instance of the first anomaly, the apparatus is configured to develop another model for predicting the instance of the first anomaly and deploying the another model to operate.

9. The apparatus according to claim 7, further configured to:
use the time series of the network performance data received before detecting the first anomaly from the at least one cluster for building the first model for predicting the instance of the first anomaly.

10. The apparatus according to claim 7, wherein the received network performance data received before detecting the first anomaly comprises network performance data received as individual values and the apparatus is operative to convert the individual values to the time series of values.

11. The apparatus according to claim 8, wherein to develop the another model for predicting the instance of the first anomaly the apparatus is operative to re-train the first model on a new set of network performance data.

12. The apparatus according to claim 8, wherein to develop the another model for predicting the instance of the first anomaly the apparatus is configured to update the first model.

13. The method according to claim 2, wherein the received network performance data comprises network performance data received as individual values and the method comprises converting the individual values to the time series of values.

14. The apparatus according to claim 8, wherein the received network performance data received before detecting the first anomaly comprises network performance data received as individual values and the apparatus is operative to convert the individual values to the time series of values.

* * * * *